May 2, 1933.  R. R. BLOSS  1,906,519
FLUID COOLED BRAKE DRUM
Filed March 30, 1931  2 Sheets-Sheet 1

INVENTOR.
RICHARD R. BLOSS
BY W. S. Babcock
ATTORNEYS.

May 2, 1933.  R. R. BLOSS  1,906,519
FLUID COOLED BRAKE DRUM
Filed March 30, 1931  2 Sheets-Sheet 2

INVENTOR
RICHARD R. BLOSS
BY *W. S. Babcock*
ATTORNEY

Patented May 2, 1933

1,906,519

UNITED STATES PATENT OFFICE

RICHARD R. BLOSS, OF BEXLEY, OHIO

FLUID COOLED BRAKE DRUM

Application filed March 30, 1931. Serial No. 526,300.

The present invention relates to fluid cooled brake drums and more especially to the shaft construction thereof.

In the drawings illustrating the invention it has been shown as applied to a draw works. It will at once be obvious that there are many other machines and apparatuses to which the invention is very readily applicable and with which any average skilled mechanic or engineer may easily and quickly combine it. Hoisting drums; cable way drums; drums of logging engines; elevator drums; are a very few of the many applications. It is applicable to any construction in which there is a fluid cooled brake drum mounted on either a solid or a thick walled revoluble shaft and in which there is provision for flow of fluid to or from the drum by way of the shaft. On the other hand further illustration by drawings, with an invention as simple as the present, would serve only to defeat the purpose of specifications by beclouding rather than clarifying.

In oil well operations, for instance, there is a tremendous load imposed on a draw works drum, imposing a great bending strain on the shaft. In addition to this heavy bending strain there is imposed, at the same time, during the lowering operation, a proportionally great twisting strain or torque while the brake is applied. One very serious objection to the constructions previously and at present in use is the weakening of the brake drum shaft by placing the radial fluid passages in the same diametrical plane. Other objections in known constructions are complexity and number of parts; difficult construction required; cost in manufacture and maintenance; and inefficiency in operation.

The main purposes of the present invention are to overcome these and other recognized objections and provide a simple, efficient, compact and economical construction which will have the least practical number of working parts for production and maintenance cost, while at the same time adequately and to the same degree cooling two or more brake flanges to avoid burning out or over-heating.

In order to more clearly disclose the construction, operation and use of the invention reference should be had to the accompanying drawings forming part of the present application. Throughout the several figures of the drawings like reference characters designate the same parts in the various views.

In the drawings:—

Figure 1:
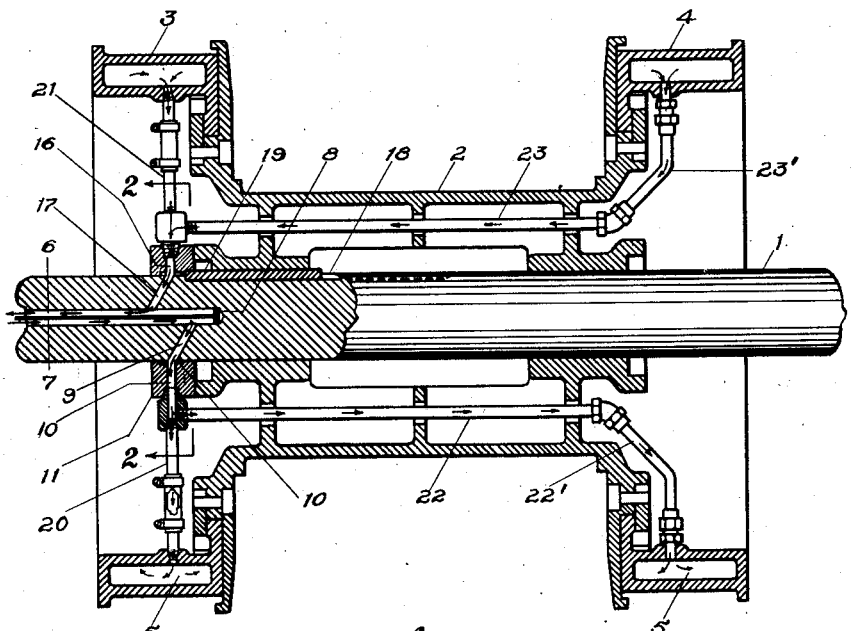
Fig. 1 is a central vertical cross section through the invention as applied to a draw works drum.
Figure 2:
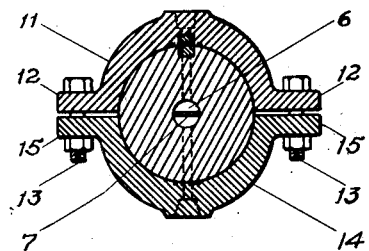
Fig. 2 is a cross section on line 2—2 of Fig. 1, enlarged.

Referring to the drawings in detail, 1 indicates the shaft of a draw works, sand reel or other rotating member. It is, of course, suitably supported in adequate journals in well known manner. To the shaft is splined or keyed a drum 2 carrying at its ends the two oppositely directed brake flanges 3 and 4. These brake flanges are expansibly connected to the drum by lugs in the same manner as clearly shown in my United States Patent 1,696,664 dated December 25, 1928 to which reference is hereby made for a detailed description, the same being no part of the present invention.

Each brake flange is provided with an annular chamber 5 to receive a cooling fluid, generally water. The fluid is supplied and withdrawn through a set of pipes and passages similar, in general, to those disclosed in my pending application Ser. No. 490,945, filed Oct. 24, 1930. Details of this circulating system will be given hereinafter. In the construction shown, as applied to a draw works drum, the shaft 1 is provided with a central longitudinal cylindrical bore 6 in which is sealed a partition plate 7 which divides the bore into two semi-cylindrical passages. A suitably backed metal disc on the inner end of the plate serves to make a complete closure at the inner end, as will be clear. One passage is the inlet as indicated by the arrows in Fig. 1 while the other acts as outlet. The inlet communicates with a bore 9 extending outwardly therefrom through the shaft. This bore, in turn leads to a bore 10 through one member 11 of a clamp collar. This clamp collar member is provided with flanges 12 to receive a clamping bolt 13. A similar member 14, with flanges 15 completes the collar, in the form shown. It, too, has a bore 16 which, similarly, acts as a continuation of the bore 17 leading to the outlet passage in the shaft. To prevent leakage between the shaft and collar, the inner ends of the bores 10 and 16 are reamed or countersunk to provide seats for small gaskets which are tightly compressed to operative positions by the action of the clamping bolts.

A special and very simple means of positively accurately aligning or registering the bores of the collar with their respective shaft bores is provided. The key-way 18 of shaft 1 is extended slightly beyond the adjacent end of the drum and into the path of the collar, when the collar is in assembled operative position. The key 19, extending to the outer end of the key way is received in a radial notch in the adjacent edge or wall of the collar. This notch is so positioned that when in position to receive the key the bore 16 will be exactly aligned with bore 17. And, of course, bore 10 is so disposed in its section that it will exactly align with bore 9 as the sections are clamped together about the shaft after first positioning the first section 11, as above. Actually, the aligning of these bores becomes automatic as the end of key 19 is seated in its notch in the collar. Each bore 10 and 16 is enlarged and threaded in its outer end to receive a tapered threaded nipple to which are separately connected, two pipes one extending radially, 20 and 21, and one extending longitudinally 22 and 23. Pipe 20 leads to chamber 5 of the left hand brake drum while pipe 22 leads through the draw works drum and by a branch 22' is connected to the opposite brake drum chamber 5. Pipe 21, on the other hand, leads from the chamber 5 of the left hand brake drum and to the outlet, while pipe 23 by a branch 23' leads from the chamber 5 of the opposite brake drum to the outlet. The inlet pipes and passages 9, 10, 20, 22 and 22' are so proportioned that the water flows at about the same pressure and rate directly to the two brake drum chambers at the same time. It does not flow to one and from that to another brake drum chamber, as in some constructions. Flowing from the feed supply directly to both at the same time it reaches them both at about the same temperature, so that they are both cooled to the same degree.

Figure 3:
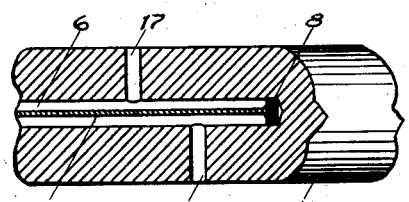
Fig. 3 is an enlarged fragmentary cross sectional view, showing one arrangement of radial passages.
Figure 4:
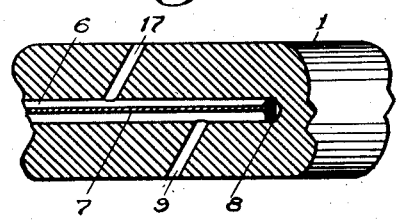
Fig. 4 is a like view showing a modification.

On reference to Figs. 1 and 4 it will be noticed that the bores 17 and 9 are inclined relatively to the radius of the shaft 1 and that they are so disposed that a plane passing through the shaft at right angles to the longitudinal axis thereof cannot intersect more than one of them. In fact there is a space longitudinally between their outer ends with a corresponding short cylindrical portion of the shaft filling the same. Consequently the bending strains will not fall upon the total weakness of the two bores at one time. It will be distributed in its effect. Furthermore, the solid portions between, above referred to as a short cylindrical portion, will resist at that point. Briefly, the shaft weakness (due to the bores) instead of being concentrated, as when they are all in one plane, is scattered. It is, therefore, proportionately decreased. The bending strains, therefore, in this construction meet a relatively decreased weakness or correspondingly increased strength. The same, of course, is true as to the torsional or twisting strains. In the modifications of Fig. 3 the same bores are similarly spaced longitudinally but they are not inclined relatively to the shaft axis. Instead they are radial.

In the form shown in Fig. 5 the lateral bores of the shaft are disposed as hereinabove set forth, but the circulation is arranged entirely differently. In this form the fluid does not pass to the two drums substantially simultaneously. Instead, it passes into the chamber of the first drum, just as in the construction of Fig. 1. It then passes from that chamber by way of a radially disposed pipe 100 to and through a longitudinally disposed pipe 101 and from that to and through a second radially disposed pipe 102 from which it enters the chamber of the second brake drum. It leaves that chamber through a third radially disposed pipe 103 through which it flows into a second longitudinally extending pipe 104. Pipe 104, through suitable elbows and short pipe sections, of obvious and well known construction, through pipe 105 communicates with the outlet bore, as in Fig. 1. Thus, in this form, the cooling fluid passes, in series or succession from one drum to the next and from that to the outlet, the feed and outlet being in the same end of the shaft. It will be noticed, both in Fig. 1 and Fig. 5, that the shaft is bored at one end only and that only a single feed and outlet connection is required. This is a great simplification in construction as compared with constructions in which the fluid is fed in at one end and drawn off at the other end. Likewise it provides a much stronger shaft as the shaft has only one set of bores, at the one end.

Figure 5:
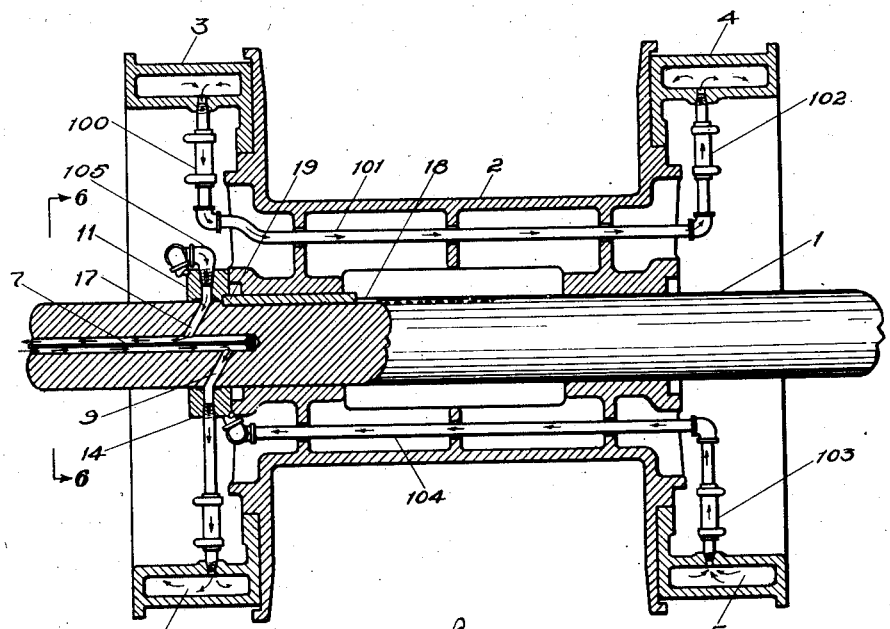
Fig. 5 is a view similar to Fig. 1, showing a modification of the circulation.
Figure 6:
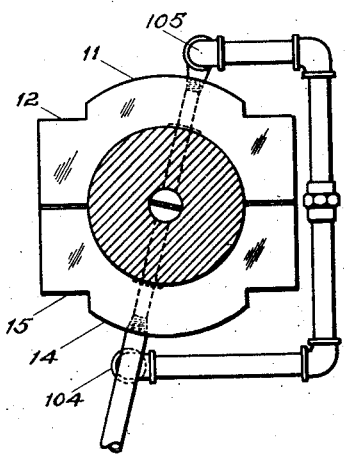
Fig. 6 is a detail view on line 6—6 of Fig. 5 and showing only the shaft, collar, and pipe connections.

Should more than two brake drums be used, in the form of Fig. 5, the series circulation will simply be extended, passing from the second to the third, etc., in the same manner as from the first to the second, and then passing from the last one to the outlet.

It will be obvious, of course, that more than one set of inlet and outlet pipes may be used. It is only necessary to duplicate the parts hereinabove described.

The invention has been illustrated as applied to the two brake flanges of a draw works. It is not believed either necessary or desirable to further illustrate other obvious applications, such as when applied to a sand reel or a bull wheel shaft, etc. The number of brake flanges in the particular apparatus is, clearly, widely variable and all are intended to be included within the scope of the appended claims of this application. The invention is applicable to and usable with one, two or more brake flanges, as will be clearly understood.

It is thought that the construction, operation and use of the invention will be clear from the preceding detailed descriptions. Changes may be made in the construction, arrangement and disposition of the various parts of the invention within the scope of the appended claims without in any degree departing from the field of the invention, and it is meant to include all such within this application wherein only one application of the invention and one modified form have been illustrated, purely as a demonstration and not intended as in any degree limiting.

Having thus described my invention, what I claim and desire to protect by Letters Patent is:—

1. In a water cooled brake drum, a shaft provided with longitudinal and lateral passages, a drum carried by said shaft, a chambered brake flange carried by said drum, a collar on said shaft and provided with bores adapted to be aligned with said lateral passages, means for aligning said bores and said lateral passages and means establishing communication between said bores and the aforesaid brake flange chamber.

2. In a water cooled brake drum, a shaft provided with longitudinal and lateral passages, a drum carried by said shaft, a chambered brake flange carried by said drum, a collar on said shaft and provided with bores adapted to be aligned with said lateral passages, means for automatically aligning said bores and said lateral passages and means establishing communication between said bores and the aforesaid brake flange chamber.

3. In a water cooled brake drum, a shaft provided with longitudinal and lateral passages, a drum carried by said shaft, a chambered brake flange expansibly mounted on said drum, a collar on said shaft and provided with bores adapted to be aligned with said lateral passages, a key in said shaft engaging said collar to align the aforesaid lateral passages and bores, and means establishing communication between said bores and the aforesaid brake flange chamber.

4. In a water cooled brake drum, a shaft provided with longitudinal and lateral passages, a drum carried by said shaft, a chambered brake flange carried by said drum, a sectional collar having bores adapted to be aligned with said lateral passages and provided with a notch, a key securing said drum and shaft together and adapted to be seated in the notch in said collar to align the bores thereof with the aforesaid lateral passages, means for clamping said collar on said shaft, and means establishing communication between said bores and said brake flange chamber.

5. In a water cooled brake, a shaft provided with longitudinal and lateral passages, a drum carried by said shaft, a chambered brake flange carried by each end of said drum, a sectional collar having bores adapted to be aligned with said lateral passages, means for securing said collar to said shaft with its bores in alignment with said lateral passages, means for establishing communication between said bores and the chamber of one of said brake flanges, and means for establishing communication between said last named means and the chamber of the other brake flange.

6. In a water cooled brake drum, a shaft provided with longitudinal and lateral passages in one end, a drum carried by said shaft, chambered brake flanges carried by said drum, means for delivering a cooling fluid from one of said longitudinal passages to the chamber of one of said flanges, means for delivering fluid from the chamber of said flange to the chamber of another flange carried by said drum, and means for delivering the fluid from the last named chamber to another of the aforesaid longitudinal passages.

7. In combination with a fluid cooled brake drum, a shaft therefor having a longitudinal passage, a partition plate within said passage dividing it into two separate passages, and passages communicating, respectively, with said separate passages at different points lengthwise of said shaft and extending laterally through said shaft, said lateral passages lying in planes intersecting the longitudinal axis of said shaft.

8. In combination with a fluid cooled brake drum, a shaft therefor having a longitudinal passage, a partition plate within said passage dividing it into two separate passages, and parallel passages communicating, respectively, with said separate passages at different points lengthwise of said shaft and extending laterally through said shaft, said lateral passages lying in planes intersecting the longitudinal axis of said shaft at different points lengthwise thereof.

9. In combination with a fluid cooled brake drum, a shaft therefor having a longitudinal passage, a partition plate within said passage dividing it into two separate passages and radial passages communicating respectively with said separate passages at different points lengthwise of said shaft and extending laterally through said shaft, said lateral passages lying in radial planes intersecting the longitudinal axis of said shaft at different points lengthwise thereof.

In testimony whereof I affix my signature.

RICHARD R. BLOSS.